US006346173B2

(12) United States Patent
Popov et al.

(10) Patent No.: US 6,346,173 B2
(45) Date of Patent: Feb. 12, 2002

(54) METHOD FOR THE VACUUM DISTILLATION OF A LIQUID PRODUCT, PARTICULARLY OIL STOCK, (VARIANTS) AND SYSTEM FOR REALIZING THE SAME

(75) Inventors: Serguei A. Popov; Evgueni D. Petroukhine, both of 11707 S. Sam Houston Pkwy. West, Suite R, Houston, TX (US) 77031

(73) Assignees: Evgueni D. Petroukhine, Limassol (CY); Serguei A. Popov, Budapest (HU)

( * ) Notice: Subject to any disclaimer, the term of this patent is extended or adjusted under 35 U.S.C. 154(b) by 0 days.

(21) Appl. No.: 09/827,586

(22) Filed: Apr. 6, 2001

Related U.S. Application Data

(63) Continuation-in-part of application No. 09/051,689, filed as application No. PCT/RU97/00259 on Aug. 15, 1997, now abandoned.

(51) Int. Cl.⁷ .............................. B01D 3/10; C10G 7/06

(52) U.S. Cl. .................. 203/91; 196/114; 196/140; 202/185.2; 202/204; 202/205; 203/100; 208/184; 208/357; 208/366

(58) Field of Search ................................ 196/114, 140; 208/184, 186, 357, 366; 202/205, 185.2, 204; 203/91, 100; 210/294, 513

(56) References Cited

U.S. PATENT DOCUMENTS

| | | |
|---|---|---|
| 1,567,429 A | 12/1925 | Earl et al. |
| 2,105,935 A | 1/1938 | Swanson |
| 2,723,950 A | 11/1955 | Peterson |

(List continued on next page.)

FOREIGN PATENT DOCUMENTS

| | | |
|---|---|---|
| DE | 1050498 | 2/1959 |
| EP | 0634198 | 12/1995 |

(List continued on next page.)

OTHER PUBLICATIONS

Spravochnik Nefteperabotchika; "Reference Book for Refines", Book; 1986; pp. 72/75; G.A. Lastovkin; Chemistry (Khimia); Leningrad.

Primary Examiner—Virginia Manoharan
(74) Attorney, Agent, or Firm—Mark A. Oathout

(57) ABSTRACT

The invention essentially relates to a method for vacuum distillation of liquids that includes feeding a polar liquid into a vacuum-producing liquid-gas jet apparatus as a motive liquid if evacuation of a nonpolar gas-vapor medium is to be effected. Further, the method includes condensing the nonpolar gas-vapor medium, forming a gas-liquid mixture, disengaging a gaseous phase from the mixture, forming a liquid emulsion containing the polar liquid and a nonpolar condensate, separating the emulsion into continuous layers, withdrawing the nonpolar condensate and recycling the polar liquid by pumping it back into the liquid-gas jet apparatus. A nonpolar liquid is to be used as the motive liquid of the liquid-gas jet apparatus if evacuation of a polar gas-vapor medium is required. There is another variant of the method applicable when an evacuated gas-vapor medium contains both polar and nonpolar components. As distinct from the previous variants, in this case, the method comprises forming a liquid emulsion containing a polar liquid, a polar condensate and a nonpolar condensate, mixing of the polar substances and forming a polar liquid medium, separation of the emulsion into layers of the polar medium and nonpolar condensate, withdrawing a surplus amount of the polar medium, and recycling a remainder of the polar medium as the motive liquid. The system realizing the methods has an evacuated reservoir with a pipeline for evacuation of a gas-vapor medium, a vacuum-producing device composed of a liquid-gas jet ejector, a separator and a pump. A suction port of the pump is connected to a section of the separator, where a layer of a liquid being used as the motive liquid settles.

6 Claims, 1 Drawing Sheet

U.S. PATENT DOCUMENTS

| | | | |
|---|---|---|---|
| 3,449,220 A | * | 6/1969 | Geisler et al. ................. 203/89 |
| 3,505,176 A | | 4/1970 | Buschsbaum et al. |
| 3,579,307 A | | 5/1971 | Wakita et al. |
| 3,856,632 A | | 12/1974 | Peter |
| 4,011,202 A | * | 3/1977 | Ebner et al. ................... 203/91 |
| 4,175,034 A | | 11/1979 | Thompson |
| 4,376,680 A | * | 3/1983 | Horak et al. .................. 203/89 |
| 5,935,388 A | | 8/1999 | Meszaros |
| 5,980,698 A | * | 11/1999 | Abrosimov et al. .......... 203/94 |
| 6,086,721 A | * | 7/2000 | Tsegelsky ................... 196/114 |

FOREIGN PATENT DOCUMENTS

| | | |
|---|---|---|
| JP | 63296801 A | 12/1988 |
| RU | 2048156 | 11/1995 |
| RU | 2050168 | 12/1995 |
| SU | 0559098 | 7/1977 |
| SU | 1819645 A1 | 6/1993 |
| WO | WO 96/16711 A1 | 6/1996 |

* cited by examiner

METHOD FOR THE VACUUM DISTILLATION OF A LIQUID PRODUCT, PARTICULARLY OIL STOCK, (VARIANTS) AND SYSTEM FOR REALIZING THE SAME

This application is a continuation in part of U.S. application Ser. No. 09/051,689, abandoned, which is a 371 of PCT/RU97/00259 filed Aug. 15, 1997 (not published in English), which was based on application number RU 96116801 filed Aug. 16, 1996.

TECHNICAL FIELD

The present invention relates to processes for the distillation of liquid products applied for fractionation of hydrocarbon liquids and concerns directly to a method and a system for separation of liquid mixtures into their components.

BACKGROUND ART

Operational methods and systems for the vacuum distillation of liquids are known, which comprise a heat-mass exchange apparatus constituting a vacuum column with pipes for feed of a pre-heated stock product and for bleeding of extracted fractions, and a jet vacuum pump constituting a steam ejector connected with a separator. The steam ejector provides for evacuation of gases and vapors of volatile fractions from the top of the vacuum column. The separator is intended for separation of a liquid phase from the steam-liquid flow (see "Guide for petroleum processor", book of G. A. Lastovkin, Leningrad, "Chemistry" Publishing house, 1964, page 74).

The main imperfections of these methods and systems are large losses of desired product entrained with a motive (ejecting) medium of the vacuum-producing device, contamination of the motive steam with the desired product and consequent high energy consumption taking place during purification of the motive steam condensate formed in the separator.

The closest analogue regarding both a method and a device, which has been chosen as the starting point for the present invention, is the invention (variants) and system for realizing the same introduced in the patent RU No 2050168, M. cl. B 01 D Mar. 10, 1992. This invention teaches a process for the vacuum distillation of a liquid (oil stock mainly) and a plant realizing this process.

The starting point process consists of the feeding of a liquid into an evacuated reservoir, evacuation of gases and vapours from the reservoir by a vacuum-producing device and further condensation of the evacuated gases and vapors.

An imperfection of this process is a poor quality base product after separation which requires after-purification of the base product and which results in additional expenses.

The system proposed in said RU patent for realization of this process comprises an evacuated reservoir with a pipeline for bleeding gases and vapours, and a vacuum-producing device constituting a circulation system composed of a liquid-gas jet ejector, a separator and a pump.

This system possesses the same imperfection: after-purification of the produced distillate is required, which results in extra expenses.

SUMMARY OF THE INVENTION

The technical problems to be solved by the present invention relate to improving fractionation quality of a hydrocarbon stock product during its distillation and increasing the environmental safety of the system.

The stated technical problems can be resolved using some features of polar and nonpolar liquids. It is known that all substances belong to one of the two big groups: polar substances and nonpolar ones. Molecules of polar substances contain non-uniformly arranged polar covalent bonds and have a non-uniform distribution of exterior electrons. Molecules of nonpolar substances contain nonpolar covalent bonds with equal attraction for shared electrons and a resulting balanced distribution of charge. One of the features of such substances is that usually a polar liquid substance can not form a homogeneous mixture with a nonpolar liquid substance. The two substances can form only an emulsion, i.e. a colloidal suspension of one liquid in another liquid. According to modern conceptions, two types of emulsions are discerned subject to the nature of a dispersion phase: emulsions of the first sort (or direct emulsions, i.e. emulsions of a nonpolar liquid in a polar liquid, for example oil/water) and emulsions of the second sort (i.e. emulsions of a polar liquid in a nonpolar liquid). Emulsions of both sorts are kinetically and aggregately unstable systems because they constitute coarse dispersions. A coalescence resulting in breaking of emulsions into uninterrupted liquid layers within a short period of time is one of the properties of said dispersions. In contrast, two polar or two nonpolar liquids can form a stable homogeneous mixture or a solution.

With regard to the method as the subject-matter of the invention the above mentioned objectives can be attained using a method for vacuum distillation of a liquid product, which includes the steps of:

feeding a nonpolar liquid product into an evacuated reservoir;

feeding a polar liquid as a motive liquid of a vacuum-producing liquid-gas jet apparatus;

evacuating a nonpolar gas-vapor medium from the reservoir by the vacuum-producing liquid-gas jet apparatus;

condensing the evacuated nonpolar gas-vapor medium by the motive liquid flowing from a nozzle of the liquid-gas jet apparatus;

forming a mixture in the liquid-gas jet apparatus of a gaseous phase and a liquid emulsion having the polar liquid and a nonpolar condensate having a condensable component of the evacuated nonpolar gas-vapor medium;

disengaging the mixture into the gaseous phase and the liquid emulsion and simultaneously separating the liquid emulsion into at least two continuous layers, one layer having the polar liquid and another layer having the nonpolar condensate;

discharging the gaseous phase after said step of disengaging the mixture into the gaseous phase and the liquid emulsion;

withdrawing the nonpolar condensate after the step of separating the liquid emulsion into at least two continuous layers;

recycling the polar liquid after the step of separating the liquid emulsion into at least two continuous layers by pumping the polar liquid back into the nozzle of the vacuum-producing liquid-gas jet apparatus as the motive liquid.

Practically the same method with only one distinction can be applied for the vacuum distillation of a polar liquid product. This distinction is that a nonpolar liquid must be used as the motive liquid of the vacuum-producing liquid-gas jet apparatus in the case where a polar liquid is to be distilled and consequently where an evacuated gas-vapor medium consists of polar components only.

There is another variant of the introduced method which can provide a solution to the stated technical problems in the case where an evacuated gas-vapor medium consists of nonpolar components and at least one polar component. In this case the method includes the steps of:

feeding a liquid product into an evacuated reservoir;

feeding a polar liquid as a motive liquid into a vacuum-producing liquid-gas jet apparatus;

evacuating a gas-vapor medium having a nonpolar component and at least one polar component from the reservoir by the vacuum-producing liquid-gas jet apparatus;

condensing the evacuated gas-vapor medium by the motive liquid flowing from a nozzle of the liquid-gas jet apparatus;

forming a mixture in the liquid-gas jet apparatus of a gaseous phase and a liquid emulsion having the polar liquid, a polar condensate from the at least one polar component of the evacuated gas-vapor medium, and a nonpolar condensate from the nonpolar component of the evacuated gas-vapor medium;

disengaging the mixture into the gaseous phase and the liquid emulsion;

mixing the polar condensate with the polar liquid and consequently forming homogeneous polar liquid medium;

separating the liquid emulsion into at least two continuous layers, one layer including the homogeneous polar liquid medium and another layer including the nonpolar condensate;

discharging the gaseous phase after the step of disengaging the mixture into the gaseous phase and the liquid emulsion;

withdrawing the nonpolar condensate after the step of separating the liquid emulsion into at least two continuous layers;

withdrawing a surplus amount of the homogeneous polar liquid medium which is equal in amount to the polar condensate;

recycling the remainder of the homogenous polar liquid medium after the step of separating the liquid emulsion into at least two continuous layers by pumping the remainder of the homogenous polar liquid medium back into the nozzle of the vacuum-producing liquid-gas jet apparatus as the motive liquid.

If an evacuated gas-vapor medium consists of polar components and at least one nonpolar component, the method includes the steps of:

feeding a liquid product into an evacuated reservoir;

feeding a nonpolar liquid as a motive liquid of a vacuum-producing liquid-gas jet apparatus;

evacuating a gas-vapor medium having polar components and at least one nonpolar component from the reservoir by the vacuum-producing liquid-gas jet apparatus;

condensing the evacuated gas-vapor medium by the motive liquid flowing from a nozzle of the liquid-gas jet apparatus;

forming a mixture in the liquid-gas jet apparatus of a gaseous phase and a liquid emulsion having the non-polar liquid, a nonpolar condensate from the at least one nonpolar component of the evacuated gas-vapor medium, and a polar condensate from the polar component of the evacuated gas-vapor medium in the liquid-gas jet apparatus;

disengaging the mixture into the gaseous phase and the liquid emulsion;

mixing the nonpolar condensate with the nonpolar liquid and consequently forming a homogeneous nonpolar liquid medium;

separating the liquid emulsion into at least two continuous layers, one layer including the homogenous nonpolar liquid medium and another layer including the polar condensate;

discharging the gaseous phase after the step of disengaging the mixture into the gaseous phase and the liquid emulsion;

withdrawing the polar condensate after the step of separating the liquid emulsion into the at least two continuous layers;

withdrawing a surplus amount of the homogenous nonpolar liquid medium which is equal in amount to the nonpolar condensate after the step of separating the liquid emulsion into the at least two continuous layers;

recycling the remainder of the homogenous nonpolar liquid medium after the step of separating the liquid emulsion into the at least two continuous layers by pumping the remainder of the homogenous nonpolar liquid medium back into the nozzle of the vacuum-producing liquid-gas jet apparatus as the motive liquid.

With regard to the apparatus as the subject-matter of the invention, a solution to the mentioned technical problems is provided by using a system for vacuum distillation of a liquid product which implements the introduced method and variants. The system has an evacuated reservoir with a pipeline for evacuation of a gas-vapor medium and a pipeline for discharging a distillation residue. Further, it includes a vacuum-producing device connected to the pipeline for evacuation of a gas-vapor medium and constituting a circulation system composed of a liquid-gas jet ejector, a separator and a pump. The separator is furnished with a pipeline for withdrawing a motive liquid, a pipeline for withdrawing a condensate of the evacuated gas-vapor medium and a pipeline for discharging a gaseous phase. One end of the pipeline for withdrawing a motive liquid is connected to a section of the separator where a layer of the motive liquid is accumulated after breaking of a liquid emulsion entering the separator into layers. Another end of this pipeline is connected to a suction port of the pump. The pipeline for withdrawing a condensate of the evacuated gas-vapor medium is connected to a section of the separator where a layer of the condensate of the gas-vapor medium is accumulated after breaking of the liquid emulsion entering the separator into layers.

In applications which require evacuation of gas-vapor mediums composed of nonpolar components and at least one polar component, a surplus amount of a polar liquid medium is generated during operation of the system due to condensation of the at least one polar component and subsequent mixing of the so formed polar condensate with the polar motive liquid in the separator. In applications which provide for evacuation of gas-vapor mediums composed of polar components and at least one nonpolar component; a surplus amount of a nonpolar liquid medium is generated during operation of the system due to condensation of the at least one nonpolar component and subsequent mixing of the so formed nonpolar condensate with the nonpolar motive liquid in the separator. Therefore in such applications the separator of the system must be furnished additionally with a pipeline for withdrawing the surplus amount of appropriate liquid medium which is equal in amount to the condensate which mixes with the related motive liquid.

Also, in the case where an evacuated medium includes both polar and nonpolar components, generally, it is preferable to use a polar motive liquid when the amount of a polar component (or components) of an evacuated medium is much smaller than the amount of a nonpolar component (or components) of the evacuated medium. And vice versa, it is better to use a nonpolar motive liquid when the amount of a nonpolar component of an evacuated medium is smaller than the amount of its polar component.

Generally, more than two liquid layers can be generated in the separator of the introduced system subject to particular composition of the liquid emulsion. Liquids accumulated in each of the layers can be removed separately. As a result, it is possible to avoid contamination of the liquid phases discharged from the separator and to use these phases as base products.

It turned out that the application of the introduced methods for distilling a liquid product by vacuum and related system can substantially improve effectiveness of the vacuum distillation and quality of the desired products, as well as eliminate such process stages as after-purification of the desired products. Consequently, additional expenses can be avoided.

Some other features of the invention will be clarified by the following examples of the realization of the invention.

DETAILED DESCRIPTION

Figure 1:
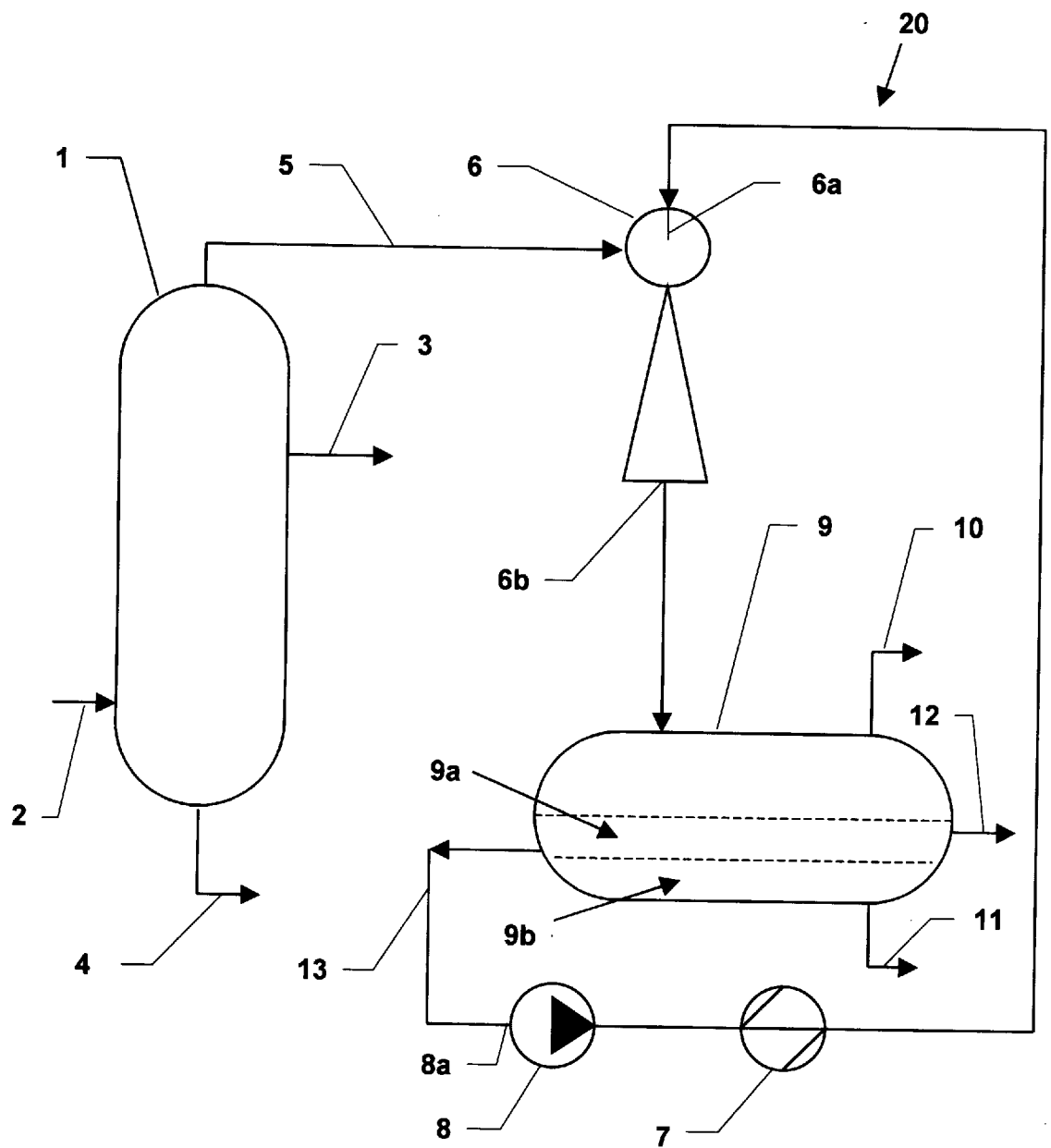
FIG. 1 represents a schematic diagram of the proposed system, which implements the method of the invention.

The system incorporates a vacuum rectification column 1 with a pipeline 2 for feeding a liquid product, a pipeline 3 for export of a side-cut distillate, a pipeline 4 for discharging a distillation residue, a pipeline 5 for evacuation of a gas-vapor medium, and a vacuum-producing device having of a liquid-gas jet ejector 6, a cooler 7, a pump 8 and a separator 9.

The pipeline 5 connects the top section of the column 1 with the jet ejector 6. The separator 9 is furnished with a gas discharge pipeline 10 connected, for example, to the fuel gas system of a refinery, a pipeline 11 for withdrawing a condensate of the evacuated gas-vapor medium and a pipeline 13 for delivery of a motive liquid to a suction port 8a of the pump 8. In some applications the separator is equipped with a pipeline 12 for withdrawing a surplus amount of the motive liquid.

Examples below illustrate application of the system for the "dry" and "wet" vacuum fractionation of a hydrocarbon product at a refinery, but the range of application of the introduced methods and related system is not limited only to the processes described hereinafter. The system implementing the introduced method operates, for example, continuously during operation as follows.

In case of the "dry" vacuum distillation a pre-heated hydrocarbon product is fed into the vacuum rectification column 1 for fractionation. Pressure at the top of the column 1 is 40–60 mm Hg. Vacuum gasoil is bled from the column 1 through the pipeline 3 as a side-cut fraction. Tar is discharged from the column bottom section through the pipeline 4. Non-condensable gases and hydrocarbon vapors are evacuated from the top of the column 1 through the pipeline 5 by the liquid-gas jet ejector 6. The evacuation takes place because a motive liquid circulates in the closed-loop vacuum-producing device 20 and entrains the gases and vapors while flowing from a nozzle 6a of the jet ejector 6. It is known that hydrocarbons are nonpolar compounds, that is why a polar liquid (water for example) is used in the given case as the motive liquid circulating in the vacuum-producing device. The pump 8 provides circulation of the motive liquid. The cooler 7 ensures required temperature conditions. Partial condensation of the nonpolar vapor components of the evacuated gas-vapor medium takes place in the ejector 6 with consequent forming of a nonpolar condensate. A two-phase gas-liquid mixture is formed at an outlet 6b of the jet ejector 6. The gaseous phase of the mixture consists of the non-condensable gaseous components and a portion of condensable components of the evacuated gas-vapor medium. The liquid phase of the mixture constitutes a liquid emulsion composed of the polar motive liquid and the nonpolar condensate. Pressure of the mixture at the ejector outlet 6b is more than 0.15 Mpa. Then the two-phase mixture passes to the separator 9, where condensation of the condensable nonpolar vapor components of the evacuated gas-vapor medium is completed. The two-phase mixture is separated in the separator 9 into a gas and the liquid emulsion. The liquid emulsion breaks into continuous layers of the polar motive liquid and nonpolar condensate. The layer of the polar motive liquid is accumulated in a volumetric section 9a of the separator 9. The layer of the nonpolar condensate is accumulated in a volumetric section 9b of the separator 9. The gas is discharged from the separator 9 through the pipeline 10 for example to the fuel gas system of the refinery. The polar motive liquid from the section 9a of the separator 9 is delivered to a suction port 8a of the pump 8 through the pipeline 13. The nonpolar condensate of the evacuated gas-vapor medium is discharged from the section 9b of the separator 9 through the pipeline 11. In this application the pipeline 12 remains blind.

The same system can be applied for the "wet" vacuum distillation of a hydrocarbon product. If the "wet" distillation is used, steam, which is a polar substance, is fed into the bottom section of a vacuum column 1 together with a nonpolar hydrocarbon product to be fractionated. This means that in this case a gas-vapor medium to be evacuated from the vacuum column 1 includes both nonpolar hydrocarbon components and one polar component (the steam).

Since a polar component is present in an evacuated gas-vapor medium together with nonpolar components, operation of the system for the vacuum distillation of a liquid product is slightly different in the "wet" process. A pre-heated hydrocarbon product is fed into the vacuum rectification column 1 for fractionation. At the same time superheated steam is fed into the bottom section of the column 1. Vacuum gasoil is bled from the column 1 through the pipeline 3 as a side-cut fraction. Tar is discharged from the column bottom section through the pipeline 4. Non-condensable gases, hydrocarbon vapors and steam are evacuated from the top of the column 1 through the pipeline 5 by the liquid-gas jet ejector 6. The evacuation takes place because a motive liquid circulates in the closed-loop vacuum-producing device 20 and entrains the gases, vapors and steam while flowing from a nozzle 6a of the jet ejector 6. Just as in the "dry" process, a polar liquid (water for example) is used as the motive liquid circulating in the vacuum-producing device 20. The pump 8 provides circulation of the motive liquid. The cooler 7 ensures required temperature conditions for the motive liquid. Partial condensation of the nonpolar vapor components and condensation of the steam take place in the ejector 6 with consequent forming of a nonpolar condensate of the hydrocarbon vapors and a polar condensate of the steam (water). A two-phase gas-liquid mixture is formed at an outlet 6b of the jet ejector 6. The gaseous phase of the mixture consists of the non-condensable gaseous components and a portion of condensable components of the evacuated gas-vapor medium. The liquid phase of the mixture constitutes a liquid emulsion composed of the polar motive liquid, the polar condensate and the nonpolar condensate. Then the two-phase mixture passes to the separator 9, where condensation of the condensable nonpolar vapor components of the evacuated gas-vapor medium is completed. The two-phase mixture is separated in the separator 9 into a gas and the liquid emulsion. At the same time, the polar motive liquid mixes with the polar condensate forming a homogeneous polar liquid medium. The liquid emulsion breaks into continuous layers of the polar liquid medium and the nonpolar condensate. The layer of the polar liquid medium resides in the volumetric section 9a of the separator 9. The layer of the nonpolar condensate resides in the volumetric section 9b of the separator 9. The gas is discharged from the separator 9 through the pipeline 10 for example to the fuel gas system of the refinery. A surplus amount of the polar liquid medium which is equal in the amount to the polar condensate is removed from the section 9a of the separator 9 through the pipeline 12. A reminder of the polar liquid medium is delivered from the section 9a of the separator 9 to a suction port 8a of the pump 8 through the pipeline 13 as the motive liquid. The nonpolar condensate of the evacuated gas-vapor medium is discharged from the section 9b of the separator 9 through the pipeline 11.

In both given examples the pipeline 12 and pipeline 13 must be connected to the section 9a of the separator 9 where the layer of the polar motive liquid or polar liquid medium is accumulated after breaking of the liquid emulsion into layers. The pipeline 11 must be connected to the section 9b of the separator 9 where a layer of the nonpolar condensate is accumulated.

INDUSTRIAL APPLICABILITY

The invention can be used in the petrochemical, chemical and some other industries, where vacuum processing of liquid products is required. It is possible to integrate the invented process into conventional fractionation process schemes and to provide transfer of hydrocarbon liquids between different process installations or process stages.

What is claimed is:

1. A method for vacuum distillation of a liquid product, comprising the steps of:
    feeding a nonpolar liquid product into an evacuated reservoir;
    feeding a polar liquid as a motive liquid into a vacuum-producing liquid-gas jet apparatus;
    evacuating a nonpolar gas-vapor medium from the reservoir by the vacuum-producing liquid-gas jet apparatus;
    condensing the evacuated nonpolar gas-vapor medium by the motive liquid flowing from a nozzle of the liquid-gas jet apparatus;
    forming a mixture in the liquid-gas jet apparatus of a gaseous phase and a liquid emulsion having the polar liquid and a nonpolar condensate comprising a condensable component of the evacuated nonpolar gas-vapor medium;
    disengaging the mixture into the gaseous phase and the liquid emulsion and simultaneously separating the liquid emulsion into at least two continuous layers, one layer having the polar liquid and another layer having the nonpolar condensate;
    discharging the gaseous phase after said step of disengaging the mixture into the gaseous phase and the liquid emulsion;
    withdrawing the nonpolar condensate after said step of separating the liquid emulsion into the at least two continuous layers;
    recycling the polar liquid after said step of separating the liquid emulsion into the at least two continuous layers by pumping the polar liquid back into the nozzle of the vacuum-producing liquid-gas jet apparatus as the motive liquid.

2. A method for vacuum distillation of a liquid product, comprising the steps of:
    feeding a liquid product into an evacuated reservoir;
    feeding a polar liquid as a motive liquid into a vacuum-producing liquid-gas jet apparatus;
    evacuating a gas-vapor medium having a nonpolar component and at least one polar component from the reservoir by the vacuum-producing liquid-gas jet apparatus;
    condensing the evacuated gas-vapor medium by the motive liquid flowing from a nozzle of the liquid-gas jet apparatus;
    forming a mixture in the liquid-gas jet apparatus of a gaseous phase and a liquid emulsion having the polar liquid, a polar condensate from the at least one polar component of the evacuated gas-vapor medium, and a nonpolar condensate from the nonpolar component of the evacuated gas-vapor medium;
    disengaging the mixture into the gaseous phase and the liquid emulsion;
    mixing the polar condensate with the polar liquid and consequently forming a homogeneous polar liquid medium;
    separating the liquid emulsion into at least two continuous layers, one layer including the homogeneous polar liquid medium and another layer including the nonpolar condensate;
    discharging the gaseous phase after said step of disengaging the mixture into the gaseous phase and the liquid emulsion;
    withdrawing the nonpolar condensate after said step of separating the liquid emulsion into the at least two continuous layers;
    withdrawing a surplus amount of the homogeneous polar liquid medium which is equal in amount to the polar condensate after said step of separating the liquid emulsion into the at least two continuous layers;
    recycling the remainder of the homogenous polar liquid medium after said step of separating the liquid emulsion into the at least two continuous layers by pumping the remainder of the homogenous polar liquid medium back into the nozzle of the vacuum-producing liquid-gas jet apparatus as the motive liquid.

3. A method for vacuum distillation of a liquid product, comprising the steps of:
    feeding a liquid product into an evacuated reservoir;
    feeding a nonpolar liquid as a motive liquid of a vacuum-producing liquid-gas jet apparatus;
    evacuating a gas-vapor medium having a polar component and at least one nonpolar component from the reservoir by the vacuum-producing liquid-gas jet apparatus;

condensing the evacuated gas-vapor medium by the motive liquid flowing from a nozzle of the liquid-gas jet apparatus;

forming a mixture in the liquid-gas jet apparatus of a gaseous phase and a liquid emulsion having the nonpolar liquid, a nonpolar condensate from the at least one nonpolar component of the evacuated gas-vapor medium, and a polar condensate from the polar component of the evacuated gas-vapor medium in the liquid-gas jet apparatus;

disengaging the mixture into the gaseous phase and the liquid emulsion;

mixing the nonpolar condensate with the nonpolar liquid and consequently forming a homogeneous nonpolar liquid medium;

separating the liquid emulsion into at least two continuous layers, one layer including the homogenous nonpolar liquid medium and another layer including the polar condensate;

discharging the gaseous phase after said step of disengaging the mixture into the gaseous phase and the liquid emulsion;

withdrawing the polar condensate after said step of separating the liquid emulsion into the at least two continuous layers;

withdrawing a surplus amount of the homogenous nonpolar liquid medium which is equal in amount to the nonpolar condensate after said step of separating the liquid emulsion into the at least two continuous layers;

recycling the remainder of the homogenous nonpolar liquid medium after said step of separating the liquid emulsion into the at least two continuous layers by pumping the remainder of the homogenous nonpolar liquid medium back into the nozzle of the vacuum-producing liquid-gas jet apparatus as the motive liquid.

4. A method for vacuum distillation of a liquid product, comprising the steps of:

feeding a polar liquid product into an evacuated reservoir;

feeding a nonpolar liquid as a motive liquid into a vacuum-producing liquid-gas jet apparatus;

evacuating a polar gas-vapor medium from the reservoir by the vacuum-producing liquid-gas jet apparatus;

condensing the evacuated polar gas-vapor medium by the motive liquid flowing from a nozzle of the liquid-gas jet apparatus;

forming a mixture of a gaseous phase and a liquid emulsion having the nonpolar liquid and a polar condensate comprising a condensable component of the evacuated polar gas-vapor medium in the liquid-gas jet apparatus;

disengaging the mixture into the gaseous phase and the liquid emulsion and simultaneously separating the liquid emulsion into at least two continuous layers, one layer having the nonpolar liquid and another layer having the polar condensate;

discharging the gaseous phase after said step of disengaging the mixture into the gaseous phase and the liquid emulsion;

withdrawing the polar condensate after said step of separating the liquid emulsion into the at least two continuous layers;

recycling the nonpolar liquid after said step of separating the liquid emulsion into the at least two continuous layers by pumping the nonpolar liquid back into the nozzle of the vacuum-producing liquid-gas jet apparatus as the motive liquid.

5. A system for vacuum distillation of a liquid product, which comprises:

a means for feeding a nonpolar liquid product into an evacuated reservoir;

a means for feeding a polar liquid as a motive liquid into a vacuum-producing liquid-gas jet apparatus;

a means for evacuating a nonpolar gas-vapor medium from the reservoir by the vacuum-producing liquid-gas jet apparatus;

a means for condensing the evacuated nonpolar gas-vapor medium by the motive liquid flowing from a nozzle of the liquid-gas jet apparatus;

a means for forming a mixture in the liquid-gas jet apparatus of a gaseous phase and a liquid emulsion having the polar liquid and a nonpolar condensate comprising a condensable component of the evacuated nonpolar gas-vapor medium;

a means for disengaging the mixture into the gaseous phase and the liquid emulsion including a means for separating the liquid emulsion into at least two continuous layers, one layer having the polar liquid and another layer having the nonpolar condensate;

a means for discharging the gaseous phase from the means for disengaging the mixture into the gaseous phase and the liquid emulsion;

a means for withdrawing the nonpolar condensate from the means for separating the liquid emulsion into the at least two continuous layers; and a means for recycling the polar liquid from the means for separating the liquid emulsion into the at least two continuous layers including a means for pumping the polar liquid back into the nozzle of the vacuum-producing liquid-gas jet apparatus as the motive liquid.

6. A system for vacuum distillation of a liquid product, which comprises:

a means for feeding a polar liquid product into an evacuated reservoir;

a means for feeding a nonpolar liquid as a motive liquid into a vacuum-producing liquid-gas jet apparatus;

a means for evacuating a polar gas-vapor medium from the reservoir by the vacuum-producing liquid-gas jet apparatus;

a means for condensing the evacuated polar gas-vapor medium by the motive liquid flowing from a nozzle of the liquid-gas jet apparatus;

a means for forming a mixture of a gaseous phase and a liquid emulsion having the nonpolar liquid and a polar condensate comprising a condensable component of the evacuated polar gas-vapor medium in the liquid-gas jet apparatus;

a means for disengaging the mixture into the gaseous phase and the liquid emulsion including a means for separating the liquid emulsion into at least two continuous layers, one layer having the nonpolar liquid and another layer having the polar condensate;

a means for discharging the gaseous phase from the means for disengaging the mixture into the gaseous phase and the liquid emulsion;

a means for withdrawing the polar condensate from the means for separating the liquid emulsion into the at least two continuous layers; and a means for recycling the nonpolar liquid from the means for separating the liquid emulsion into the at least two continuous layers including a means for pumping the nonpolar liquid back into the nozzle of the vacuum-producing liquid-gas jet apparatus as the motive liquid.

* * * * *